The specification has [illegible]
to see the [illegible]
9784X
S. WHITMAN.
ROTARY STEAM ENGINE.
Patented June 25, 1836.
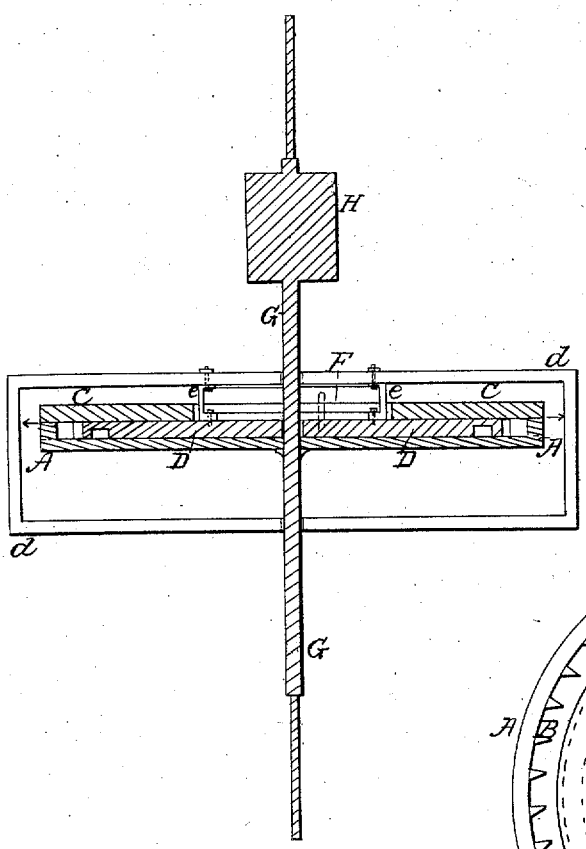
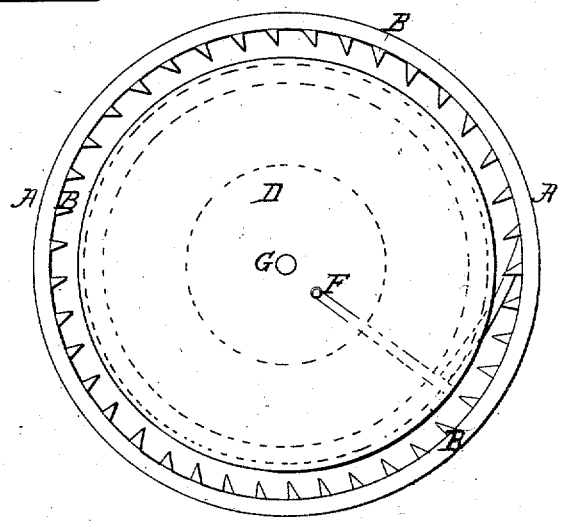

an 12

June 25. 1836 389.

Shepherd Whitman 9784X
Letters Patent

The Schedule referred to in these Letters Patent and making part of the same containing a description in the words of the said Shepherd Whitman himself of his "improvement in the Rotary Steam Engine."

To all persons to whom these presents shall come. Shepherd Whitman in the County of Floyd and State of Indiana and Town of New Albany Physician and Engineer sends Greeting. Be it known that I the said Shepherd Whitman have after patient and investigation and at great expense invented and put to use a new and useful improvement in the mode of working steam to produce mechanical power. called Whitmans Rotary Steam Engine. which is described in the following words to wit: It consists of a cast iron wheel twenty eight inches diameter and when finished 1/2 an inch thick having on its circumference a rim or flange projecting over one side like the flanch of a cast iron boiler head or like the cover of a snuff box to the distance of one inch. and one inch deep. On the inside of this rim are cast teeth, the section of which are triangular, and are something like the teeth of a rag or ratchet wheel, only the teeth are on the inside. the teeth or buckets are 5/8 of an inch deep and 3/4 of an inch broad on their base and one inch long they stand about 1 3/4 inches asunder and in all cases the spaces between the bases of the teeth should be equal to the bases of the teeth themselves. These teeth are enclosed by the plate or disk of the wheel on one side and on the other side by a circular plate about 5 1/2 inches broad and 28 inches diameter screwed steam tight to the rim of the main wheel. This wheel is hung on a shaft ~~on a shaft~~ 30 inches long and the body of the shaft is about one and ~~and~~ half or may be two inches diameter the journals are 3/4 of an inch diameter and five inches long This This shaft may be made of steel or iron but steel is the best.
The journals run on leather but for larger ones good bell
metal is thought to be prefferable. There is a central sta
tionary wheel secured in its proper place by fastenings
to the cast iron box which envelopes the whole. This central
stationary wheel is of such diameter that when placed be-
tween the disk of the main wheel and the flat cover or ring
that the bottom of the groove which is made around the whole
circumference of this stationary wheel, which is one inch
wide 3/8 of an inch deep will approach the inner points of
the buckets to the distance of 3/4 of an inch. This central sta
tionary wheel has attached to it at the upper side a con
ductor or conveyor of the steam which directs the steam to
the face of the teeth or buckets directing the steam in a line as
near at right angles with the radius of the wheel as may
be. The mouth of the conductor stands in the groove of the
stationary central wheel the open^ing^ of which at the discharging
^point^ is one inch long 3/16 wide. The case which envelopes the
engine may be made square or round as best suits the
fancy of the builder, but if made square room may left
at the bottom to heat the supply water. The steam escapes
immediately behind the conductor by an opening made for this pur-
pose through the centre stationary wheel and is discharged in
to the case or envelope through a circular opening around
the other shaft. And thence to the open air through an open
ing of proper size at any convenient place. On the shaft towards
one end is placed a cast iron or other metal pulley 5 inches
diameter and 6 inches long. This pulley carries a leather belt
over the surface or of wheel some 5 or 6 feet diameter thus
reducing the motion until it suits the purpose wanted.
The motion of this engine will be when the steam is at one
hundred pounds to the superficial square inch about six thou
sand revolutions per minute when at work but when run
ning ning without any load its motion would be something like [illegible]
10 or 11 thousand per minute. An opening of one sixty fourth of a
square inch will discharge as much steam at 100 pounds expan-
sive force as 15 feet of boiler fire surface will make under ordi-
nary circumstances. The engine I have just described having
an opening of 12/64 of an inch would require 12 X 15 fire surface
180 and would require two cylinder boilers 28 inches diame-
ter and 26 feet long). This would produce about a 30 horse
power or a power of 460 pounds moving at the rate of 1080 feet
per minute. The proportions of this engine may be varied
to infinity; but the one here laid down is at this time the best for
a 30 horse power engine. But where the power amounts to
100 or thousand horse power the diameter of the wheel should
be increased &c. But it is the inventors candid opinion that
the diameter of the wheel in no case ought to exceed five feet.
Bands or belts are in all cases to be used where the motion
exceeds that of a mill stone. To reduce the motion of the engine
here described making 5000 revolutions — the pulley on the shaft
being 5 inches. A drum 5 feet diameter would reduce it
to 416 2/3 revolutions and this motion can be easily reduced
further to suit any purpose whatever by other bands and
pullies. It should be remarked that the gear should always
be so as to give the engine not less than five thousand revolutions
when the wheel is 28 inches diameter or you cannot obtain
the power of the steam or in other words the motion of the
circumference of the wheel should never be less than one
half of the motion of the steam you are working. For 100 lb
the motion is about 1800 hundred per second or 108.000 feet
per minute for 28 the one half that or 54.000. A further
description of the engine is deemed superfluous and the rea-
der is referred to an examination of the model at the pat
tent office made on a scale of 1/2 of an inch to an inch
in all its essential parts. The peculiar ground on which

9784X a patent is claimed are the following — 1st That the steam is
perfected on the inside of the wheel in such a manner as
to prevent its condensation and escape before it has expended
its influence to move the wheel — 2nd The parts of the engine
where the steam is applied need no packing, nor need touch
each other at least by [illegible] 1/8 of an inch, while the steam
is compelled to act from its centrifugal force — 3rd it is sim-
ple, easy of construction and requires no hollow shaft — 4 That
from experiments I have made it produces much more power
than any other rotary which can be kept in repair when in
use. In testimony that the above is a true description of
this my said instrument I have hereunto set my hand this
23rd day of April in the year of our Lord one thousand
eight hundred and thirty six Witnesses
K. Morris — Shepherd Whitman
L. J. Atherton Drawings Made Ex.d

[illegible]

1320 words